US012033637B2

(12) United States Patent
Carbune et al.

(10) Patent No.: US 12,033,637 B2
(45) Date of Patent: Jul. 9, 2024

(54) ARRANGING AND/OR CLEARING SPEECH-TO-TEXT CONTENT WITHOUT A USER PROVIDING EXPRESS INSTRUCTIONS

(71) Applicant: GOOGLE LLC, Mountain View, CA (US)

(72) Inventors: Victor Carbune, Zurich (CH); Krishna Sapkota, Zurich (CH); Behshad Behzadi, Freienbach (CH); Julia Proskurnia, Zurich (CH); Jacopo Sannazzaro Natta, Berkeley, CA (US); Justin Lu, Zurich (CH); Magali Boizot-Roche, Zurich (CH); Márius Šajgalík, Zurich (CH); Nicolo D'Ercole, Oberrieden (CH); Zaheed Sabur, Baar (CH); Luv Kothari, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 514 days.

(21) Appl. No.: 17/337,804

(22) Filed: Jun. 3, 2021

(65) Prior Publication Data
US 2022/0366911 A1 Nov. 17, 2022

Related U.S. Application Data

(60) Provisional application No. 63/189,386, filed on May 17, 2021.

(51) Int. Cl.
*G10L 15/26* (2006.01)
*G10L 15/22* (2006.01)

(52) U.S. Cl.
CPC .............. *G10L 15/26* (2013.01); *G10L 15/22* (2013.01); *G10L 2015/223* (2013.01)

(58) Field of Classification Search
None
See application file for complete search history.

(56) References Cited

U.S. PATENT DOCUMENTS 9,135,231 B1    9/2015   Barra et al.
10,679,620 B2 *  6/2020   Talwar ............... G06F 3/167
(Continued)

FOREIGN PATENT DOCUMENTS

WO    8904035    5/1989

OTHER PUBLICATIONS

Spinelli et al.; An Intonational Cue to Word Segmentation in Phonemically Identical Sequences; vol. 72/3; 14 pages; dated Apr. 1, 2010.

(Continued)

*Primary Examiner* — Neeraj Sharma
(74) *Attorney, Agent, or Firm* — Gray Ice Higdon

(57) ABSTRACT

Implementations described herein relate to an application and/or automated assistant that can identify arrangement operations to perform for arranging text during speech-to-text operations—without a user having to expressly identify the arrangement operations. In some instances, a user that is dictating a document (e.g., an email, a text message, etc.) can provide a spoken utterance to an application in order to incorporate textual content. However, in some of these instances, certain corresponding arrangements are needed for the textual content in the document. The textual content that is derived from the spoken utterance can be arranged by the application based on an intent, vocalization features, and/or contextual features associated with the spoken utterance and/or a type of the application associated with the document, without the user expressly identifying the corresponding arrangements. In this way, the application can infer (Continued)

content arrangement operations from a spoken utterance that only specifies the textual content.

16 Claims, 7 Drawing Sheets

(56) References Cited

U.S. PATENT DOCUMENTS

| | | | | |
|---|---|---|---|---|
| 11,335,334 B2* | 5/2022 | Iwase | | G10L 15/02 |
| 2002/0133338 A1* | 9/2002 | Ono | | G10L 15/22 |
| | | | | 704/E15.04 |
| 2005/0171779 A1* | 8/2005 | Joublin | | G10L 15/1822 |
| | | | | 704/270.1 |
| 2009/0125899 A1* | 5/2009 | Unfried | | G10L 15/065 |
| | | | | 704/235 |
| 2010/0057463 A1* | 3/2010 | Weng | | G06F 40/40 |
| | | | | 704/E15.001 |
| 2010/0241418 A1* | 9/2010 | Maeda | | G10L 15/1815 |
| | | | | 704/E15.001 |
| 2012/0323578 A1* | 12/2012 | Kubota | | G10L 13/00 |
| | | | | 704/E13.011 |
| 2014/0149119 A1* | 5/2014 | Sak | | G10L 15/083 |
| | | | | 704/260 |
| 2019/0163437 A1* | 5/2019 | Nagasaka | | G06Q 30/06 |
| 2020/0167379 A1 | 5/2020 | Faruqui et al. | | |
| 2021/0233537 A1* | 7/2021 | Yang | | G10L 15/22 |

OTHER PUBLICATIONS

European Patent Office; International Search Report and Written Opinion issued in Application No. CT/US2021/062904 ; 12 pages; dated Apr. 4, 2022.

* cited by examiner

ARRANGING AND/OR CLEARING SPEECH-TO-TEXT CONTENT WITHOUT A USER PROVIDING EXPRESS INSTRUCTIONS

BACKGROUND

Humans can engage in human-to-computer dialog sessions with interactive software applications referred to herein as "automated assistants" (also referred to as "chat bots," "interactive personal assistants," "intelligent personal assistants," "personal voice assistants," "conversational agents," etc.). Automated assistants typically rely upon a pipeline of components in interpreting and responding to user inputs. For example, a speech processing engine can be used to process audio data that captures a spoken utterance of a user, and to generate textual context, such as a transcription (i.e., sequence of term(s) and/or other token(s)) of the spoken utterance. Further, a natural language understanding (NLU) engine can be used to process the textual content, and to generate NLU output, such as an intent of the user in providing the spoken utterance and optionally slot value(s) for parameter(s) associated with the intent.

In some cases, a user can employ an automated assistant and/or a software application that is accessible to an automated assistant (also referred to simply as "application") to perform certain speech-to-text operations using the speech processing engine. For instance, a user can employ an automated assistant and/or application to dictate textual content on behalf of the user, and the textual content can be incorporated into a document (e.g., a word processing document, an email, a text message, etc.). However, subsequent to the textual content being incorporated into the document, the user often has to manually manipulate the textual content with arrangement operations in order to format the textual content with a desired arrangement (i.e., spacing, punctuation, capitalization, indentations, etc.). For instance, the user can provide additional spoken utterances to perform some of these arrangement operations, such as providing spoken commands of "comma" to add a comma into the document, "new line" to start a new line of the document, "indent" to add an indentation into the document, etc., and/or provide similar arrangement operation commands via a separate keyboard or computer mouse interface.

Further, in some of these cases, the user may provide a spoken command of "clear" or "delete" in order to remove a portion of textual content that is already incorporated in the document. However, it may not be immediately clear which textual content that the user desires to be removed from the document. Accordingly, the application may remove some standard length of text each time the user provides one of these spoken commands. For instance, the application may only delete a single letter or word each time the user provides one of these spoken commands, regardless of any context associated with the document or the spoken utterance that includes the spoken command. The user may again therefore rely on other separate interfaces, such as a keyboard or computer mouse, instead of an audio interface when selecting particular textual content to be deleted. As a result, computational resources of a device utilized to perform these speech-to-text operations in dictating textual content to be incorporated into a document may be wasted and/or the interaction with the automated assistant and/or the application prolonged based on the user having to provide these specific spoken commands to achieve a desired arrangement, based on the subsequent manual manipulation of the textual content, and/or based on the user switching between these separate interfaces.

SUMMARY

Implementations set forth herein relate to an automated assistant and/or an application that can, in response to receiving a spoken utterance from a user, perform speech-to-text operations that involve organizing textual content, corresponding to the spoken utterance, in a manner that may not be expressly detailed by the user. In this way, the user can employ the automated assistant and/or the application for speech-to-text operations without having to expressly identify every operation that should be performed to render a desired arrangement of the textual content. For example, a user can provide a spoken utterance to an automated assistant to cause the automated assistant to perform a speech-to-text operation in furtherance of drafting an email invitation. The spoken utterance can be provided while the user is accessing an email application and after the user has initialized the automated assistant for detecting speech to be converted to textual content that will be incorporated into a field of the email application. For instance, when the user has initialized an audio interface for communicating with the automated assistant, the user can provide a spoken utterance such as, "Hi Adam . . . Friendly follow up to send me those meeting notes. Take care, Ronald." Although the user did not expressly identify any formatting, punctuation symbols, capitalization, and/or other directions for arranging textual content as shown in the spoken utterance, the automated assistant can generate content arrangement data that characterizes an arrangement for the textual content to be included in the field of the email application, and for directing the email application to arrange the textual content according to the arrangement.

In various implementations, in response to receiving the spoken utterance, the automated assistant can cause audio data corresponding to the spoken utterance to be processed, using a speech processing engine, to generate textual content data that characterizes textual content to be incorporated into a field of a document (e.g., a word processing document, an email, a text message, etc.) of an application. Further, the automated assistant can determine an intent of the user in drafting the document to generate content arrangement data that characterizes an arrangement, within a field of the document, for incorporating the textual content into the field of the document. The content arrangement data can identify one or more operations for the application to perform in order to arrange the textual content according to the arrangement and based on the spoken utterance from the user.

In some versions of those implementations, the intent of the user in drafting the document can be determined based on the spoken utterance. For example, audio data corresponding to the spoken utterance and/or textual content generated based on the spoken utterance can be processed using one or more heuristic processes and/or one or more trained machine learning models (e.g., natural language understanding (NLU) model(s)), and the intent of the user can be determined based on output generated using one or more of the heuristic processes and/or one or more of the trained machine learning models. For instance, assume the user provides a spoken utterance of "Assistant, email Adam 'Hi Adam . . . Friendly follow up to send me those meeting notes. Take care, Ronald'" In this instance, the automated assistant can determine, based on the processing, that the user is intending to draft an email document using an email application, which can embody one or more first formatting features that are indicative of the email document, even though the user did not explicitly identify the operations. The one or more first formatting features can include, for example, a comma after the greeting (e.g., "Hi Adam,") in the textual content, one or more new paragraph lines or carriage returns after the comma, one or more periods (e.g., after "notes"), one or more new paragraph lines or carriage returns before the sign off (e.g., "Take care, Ronald"), a signature block after the sign off, etc. In some versions of these implementations, these first formatting features can be identified based on prior interactions between the user and the automated assistant via the email application and/or prior interactions between one or more other users and one or more other devices via respective email applications.

In contrast, assume the user provides a spoken utterance of "Assistant, text Adam 'Hi Adam . . . Friendly follow up to send me those meeting notes. Take care, Ronald.'" In this instance, the automated assistant can determine, based on the processing, that the user is intending to draft a text message document using a text messaging application, which can embody one or more second formatting features that are indicative of the text message document, even though the user did not explicitly identify the operations, and that are distinct from the one or more first formatting features that are indicative of the email document described above. The one or more second formatting features can also include, for example, one or more of the punctuation features of the first formatting features, such as the comma after the greeting (e.g., "Hi Adam,") in the textual content and one or more of the periods (e.g., after "notes"). However, the second formatting feature(s) can additionally or alternatively include one or more second punctuation features that differ from the first formatting features. For instance, a period can be provided after the greeting (e.g., "Hi Adam.") in lieu of the comma, and a period can be omitted after "notes" and, instead, an em dash or no punctuation provided after "notes". Moreover, the one or more second formatting features may not include the one or more new paragraph lines or carriage returns after the comma, the one or more new paragraph lines or carriage returns before the sign off (e.g., "Take care, Ronald"), or the signature block after the sign off since the text message document is more informal. Similarly, in some versions of these implementations, the second formatting features can be identified based on prior interactions between the user and the automated assistant via the text messaging application and/or prior interactions between one or more other users and one or more other devices via respective text messaging applications. For example, the prior interaction(s) via the text messaging application can indicate that greetings are most often (or always) followed by periods instead of commas, and a period can be provided after the greeting (e.g., "Hi Adam.") based on such prior interaction(s).

In additional or alternative versions of those implementations, the intent of the user in drafting the document can be determined based on a type of the application in which the user initialized the audio interface for communicating with the automated assistant. For example, assume the user provides a spoken utterance of "Hi Adam . . . Friendly follow up to send me those meeting notes. Take care, Ronald" subsequent to initializing the audio interface from the email application. In this example, the automated assistant can generate one or more of the first formatting features that are indicative of the email document described above, even though the user did not explicitly identify the operations. In contrast, assume the user provides a spoken utterance of "Hi Adam . . . Friendly follow up to send me those meeting notes. Take care, Ronald" subsequent to initializing the audio interface from the text messaging application. In this example, the automated assistant can generate one or more of the second formatting features that are indicative of the text message document described above, even though the user did not explicitly identify the operations. In some versions of those implementations, the sign off may be automatically incorporated into the document based on the type of application (e.g., when the application is an email application), even if the user did not expressly identify the sign off in the spoken utterance, whereas in other versions of those implementations, the sign off may be omitted based on the type of application (e.g., when the application is a text messaging application).

In some implementations, the application, that is indicated in the user's utterance and/or in which the user initialized the audio interface, can additionally or alternatively be utilized in determining one or more formatting feature(s). For example, assume the user provided, after initializing the automated assistant in a given application, a spoken utterance of "Hi Catherine Jane wanted to let you know that swordfish is delayed two weeks". In a first scenario, assume data provided by the given application and/or otherwise associated with the given application indicates a contact of the user is "Catherine Jane" and that the user lacks a "Catherine" (without "Jane") contact and lacks a "Jane" contact, and further indicates that "swordfish" is a defined project that is being tracked via the application. In the first scenario, a comma can be inserted immediately after "Catherine Jane", a carriage return included after the comma, and "Swordfish" can be capitalized (i.e., the formatting will reveal that the message is addressed to "Catherine Jane" and the sending user is indicating the Swordfish project will be delayed). In a second scenario, assume data provided by the given application and/or otherwise associated with the given application indicates contacts of the user include "Catherine" (without "Jane") and "Jane" (not preceded by "Catherine"), and further lacks any indication that "swordfish" is a defined project or other defined entity of the application. In the second scenario, a comma can be inserted after "Catherine", a carriage return included after the comma, and "swordfish" will not be capitalized (i.e., the formatting will reveal that the message is addressed to "Catherine" and that "Jane" has indicated that swordfish (e.g., a shipment of the fish) is delayed).

In various implementations, the content arrangement data can additionally or alternatively be generated based on one or more other signals associated with the spoken utterance. For instance, the content arrangement data can additionally or alternatively be generated based on one or more acoustic (or vocalization) features of the spoken utterance that are determined based on processing the audio data that captures the spoken utterance using one or more heuristic processes and/or one or more trained acoustic-based machine learning models. These acoustic features can include, for example, one or more prosodic properties of the spoken utterance, such as intonation, tone, stress, rhythm, tempo, and/or pause. For instance, one or more pauses in the spoken utterance (e.g., as indicated by the ellipses in the spoken utterance of "Hi Adam . . . Friendly follow up to send me those meeting notes. Take care, Ronald") can indicate that the user desires a comma or to be inserted after the greeting (e.g., "Hi Adam") and/or that the user desires one or more new paragraph lines or carriage returns to be inserted after the greeting. Also, for instance, the tone of the spoken utterance can indicate that the user desires to convey a professional tone, and, as a result, the signature block may be inserted after the sign off (e.g., "Take care, Ronald").

In some implementations, operations to modify the textual content that is already incorporated into the document can be performed by the automated assistant in response to requests from a user, even though the user may not particularly describe each operation to be performed. For example, if a user desires to remove textual content from the document, the user can describe the textual content to be removed via a spoken utterance. However, the user is more likely to simply provide a spoken utterance such as, "delete," "clear," or "backspace," which may have different meanings under different circumstances. In response to receiving a command to remove some of the textual content, the automated assistant can determine an amount of content to remove from the textual content based on a context in which the user previously provided the textual content and/or the spoken utterance. This determination can additionally or alternatively be based on one or more prior interactions between the user and the automated assistant, the user and another application, and/or one or more other users and/or one or more other computing devices via respective applications.

For example, based on a previous spoken utterance in which the user recited individual characters of a proper name (e.g., "C, H, A, N, C . . . "), the automated assistant can determine that, when the user provides a subsequent "clear" command, that subsequent "clear" command is intended to remove only a single character from the proper name (e.g., "C") for which the user recited the individual characters. Further, when the user provides a further subsequent "clear" command, the automated assistant can determine that further subsequent "clear" command is intended to remove only a previous, single character from the proper name (e.g., "N") for which the user recited the individual characters. In contrast, based on a previous spoken utterance in which the user recited word-for-word content (e.g., "We look forward to . . . "), the automated assistant can determine that, when the user provides a subsequent "clear" command, that "clear" is intended to remove a single word, or a single sequence of words that refer to a single entity (e.g., "soap opera", "New York"), that was most recently incorporated into the field of the application (e.g., "to"). Further, when the user provides a further subsequent "clear" command, the automated assistant can determine that further subsequent "clear" command is intended to remove only a previous, single word from that was incorporated into the field of the application (e.g., "forward").

In some implementations, more than a single word, or more than a single sequence of words that refer to a single entity, can be deleted responsive to a "clear" command. In some of those implementations, determining to remove more than a single word, or more than a single sequence of words that refer to a single entity, can be based on feature(s) of the removed words and/or an amount of time between completing the utterance that resulted in the removed words and speaking the "clear" command. Feature(s) of the removed words can include, for example, speech recognition confidence score(s) for the word(s), whether they are in a speech recognition vocabulary and/or application vocabulary, and/or whether they are typical for the user (and optionally the context). As an example, if the speech recognition confidence scores for the last three words fail to satisfy a threshold (but the word(s) preceding those last three have speech recognition confidence scores satisfying the threshold) and the "clear" command is provided within 30 milliseconds of completing speaking of the utterance that resulted in the transcription of the three words, then the "clear" command can remove all three words. On the other hand, if the speech recognition confidence scores for the last word fails to satisfy a threshold (but the words preceding the last word have speech recognition confidence scores satisfying the threshold) and/or "clear" command is provided after 500 milliseconds of completing speaking of the utterance, then the "clear" command can remove only the last word.

In various implementations, successive commands that indicate a desire to remove textual content from the document can progressively cause more textual content to be removed. For example, assume the textual content is included in an email document that includes three paragraphs that the user dictated using a word-for-word pattern. In this example, a first instance of the "clear" command can cause a most recently incorporated word to be removed from the email (e.g., the last word in the third paragraph). Further, a second instance of the "clear" command can cause a most recently incorporated group of words or a sentence to be removed from the email (e.g., the last sentence in the third paragraph). Moreover, a third instance of the "clear" command can cause a most recently incorporated group of sentences or a paragraph to be removed from the email (e.g., the third paragraph). Accordingly, for each successive instance of the command, the length of the amount of content to be removed from the document can be increased.

By using the techniques described here, various technical advantages can be achieved. As one non-limiting example, the techniques described herein enable the automated assistant and/or the application that is accessible to the automated assistant to contextually format textual content to be included in a document that is generated based on spoken utterances of a user without the user having to explicitly specify how to format the textual content. As a result, a duration of the human-to-computer dialog between the user and the automated assistant can be reduced, a quantity of user inputs that includes commands that explicitly specify how to format the textual content can be reduced, and a quantity of occurrences of the user switching between interfaces can be reduced, and/or a quantity of manual edits by the user and of the document subsequent to the human-to-computer dialog can be reduced, thereby conserving computational resources at a client device utilized in performance of the human-to-dialog and/or conserving network resources in implementations where the automated assistant and/or the application is executed at least in part by one or more remote systems.

The above description is provided as an overview of some implementations of the present disclosure. Further description of those implementations, and other implementations, are described in more detail below.

DETAILED DESCRIPTION

Figure 1A:
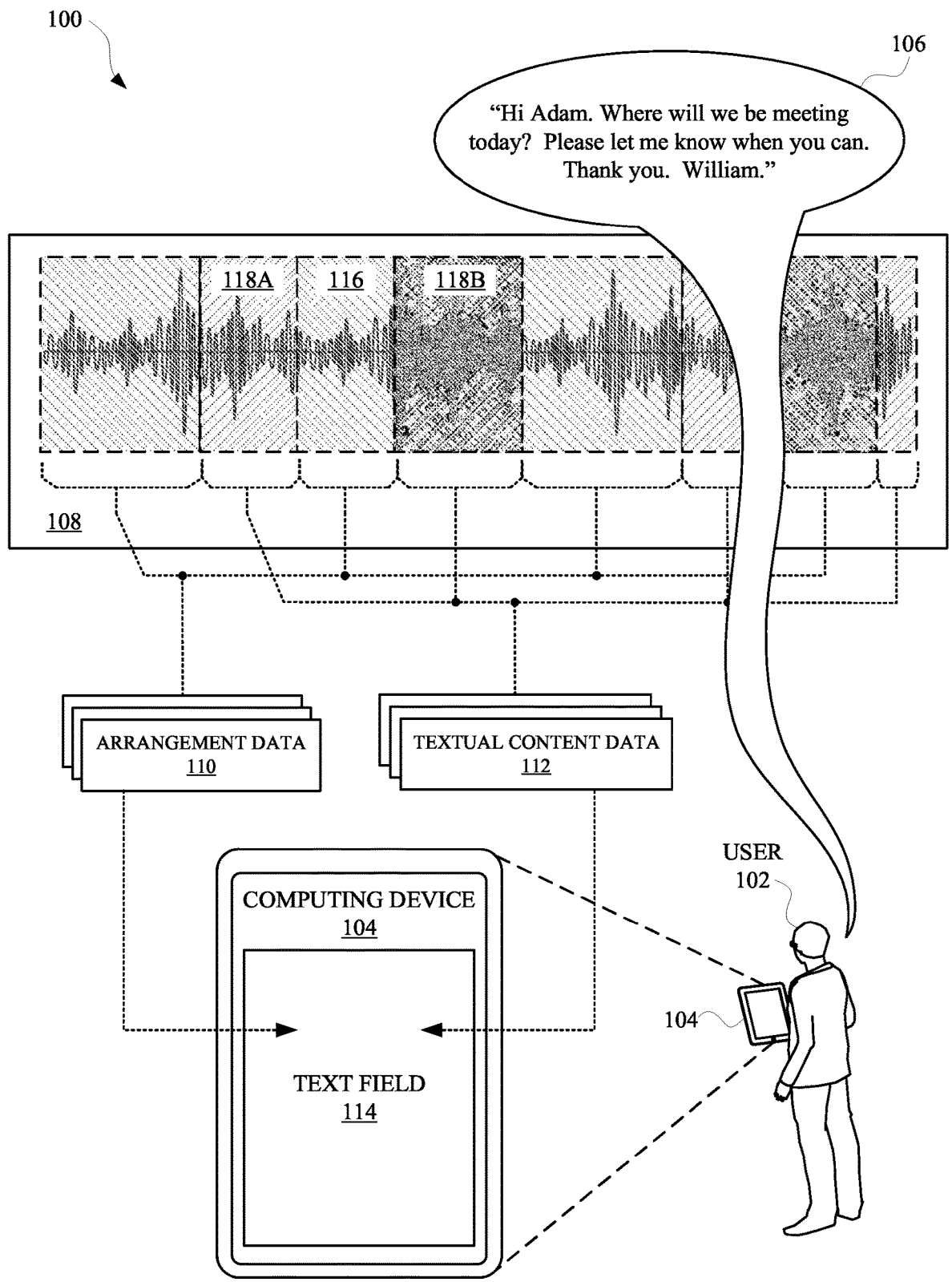
FIG. 1A, FIG. 1B, FIG. 1C, and FIG. 1D illustrate views of a user providing spoken utterances to an application that can generate textual content data and arrangement data based on the spoken utterances.

FIG. 1A, FIG. 1B, FIG. 1C, and FIG. 1D illustrate, respectively, a view 100, a view 120, a view 140, and a view 160 of a user 102 providing spoken utterances to an application that can generate textual content data and arrangement data based on the spoken utterances. The textual content data and arrangement data can be processed in order to incorporate natural language content into a text field 114 in accordance with the arrangement data. In some implementations, the application can be an automated assistant application and/or any other application capable of receiving spoken inputs from a user that optionally leverages capabilities of an automated assistant. Alternatively, or additionally, the application (e.g., a first application) can interact with an additional application (e.g., second application) in order to generate content for a text field 114 of the additional application. For example, the user 102 can provide a spoken utterance 106 such as, "Hi Adam . . . Where will we be meeting today? . . . Please let me know when you can . . . Thank you . . . William." The spoken utterance 106 can optionally be provided after the user 102 has initialized a voice input feature of the application via an invocation gesture or button (e.g., a software button or hardware button) and/or provided an invocation command (e.g., "Hey, Assistant.") to the application that invokes the automated assistant.

In response to receiving the spoken utterance 106 at a computing device 104, the computing device 104 and/or the application can generate audio data 108 corresponding to the spoken utterance 106 (e.g., via microphone(s) of the computing device 104). In some implementations, the audio data 108 can be processed (e.g., using one or more heuristic processes and/or one or more trained machine learning models (e.g., NLU model(s))) to determine one or more intents and/or operations to be executed in order for the application to be responsive to the spoken utterance 106. For example, the one or more intents determined based on processing the audio data 108 can provide a basis for generating arrangement data 110, which can characterize one or more formatting operations that should be performed in response to the spoken utterance 106. The one or more intents can additionally, or alternatively, be determined based on the application in which the automated assistant is invoked. The audio data 108 can also be processed (e.g., using speech processing engine 208 described with respect to FIG. 2) to provide a basis for generating textual content data 112, which can characterize textual content that should be incorporated into a text field 114 of the application or an additional application in response to the spoken utterance.

Figure 1B:
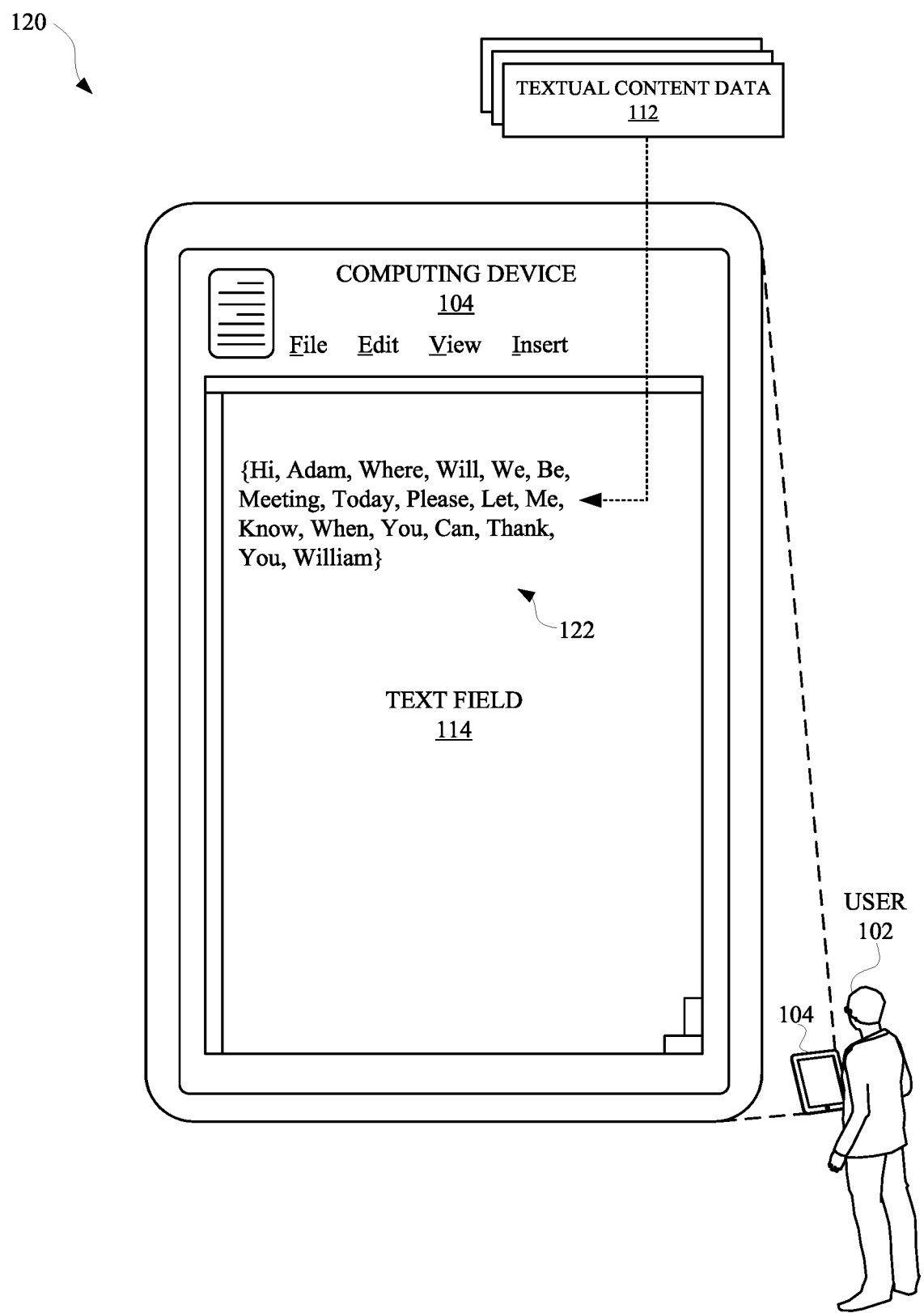
Figure 1C:
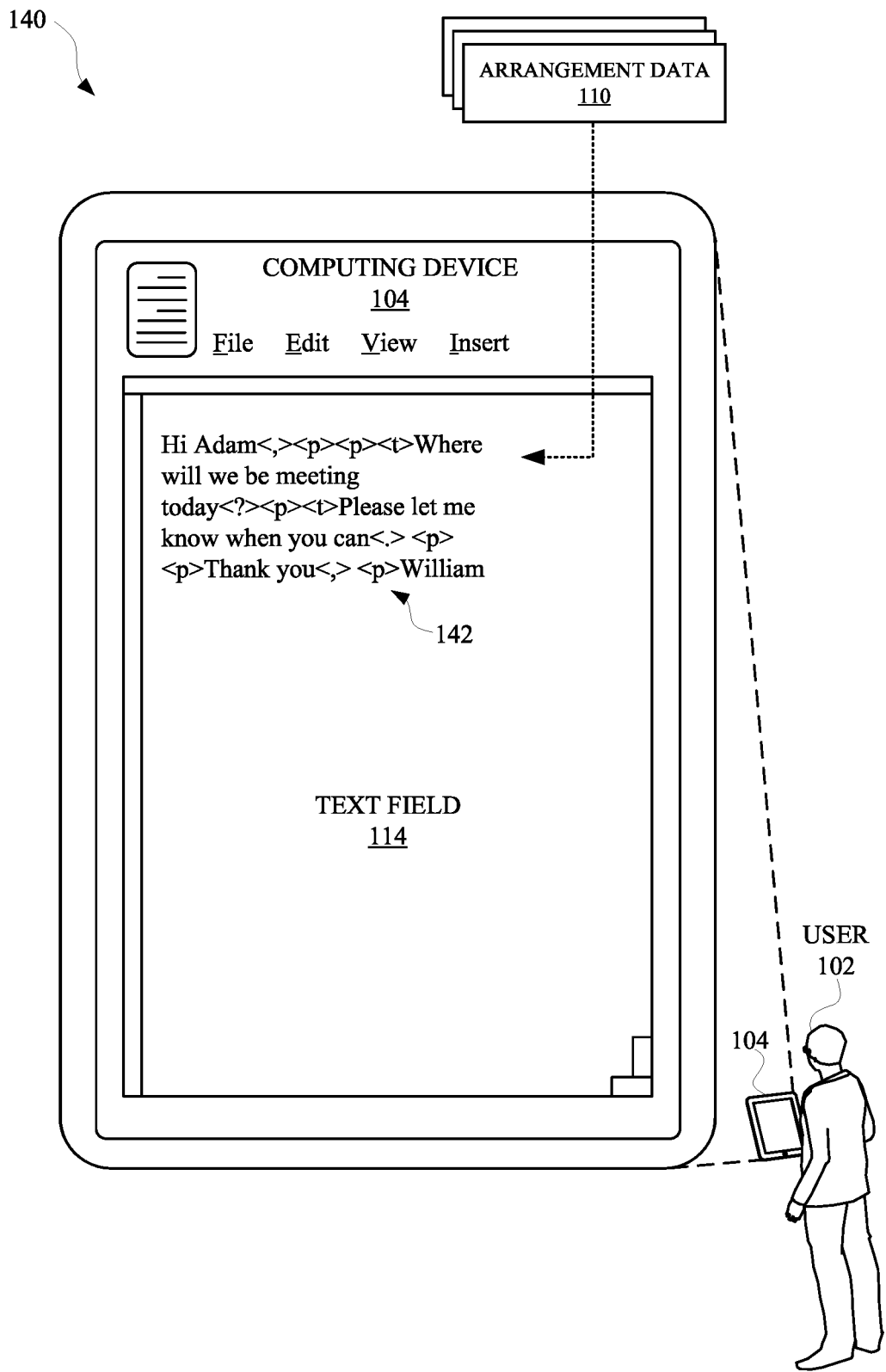
Figure 1D:
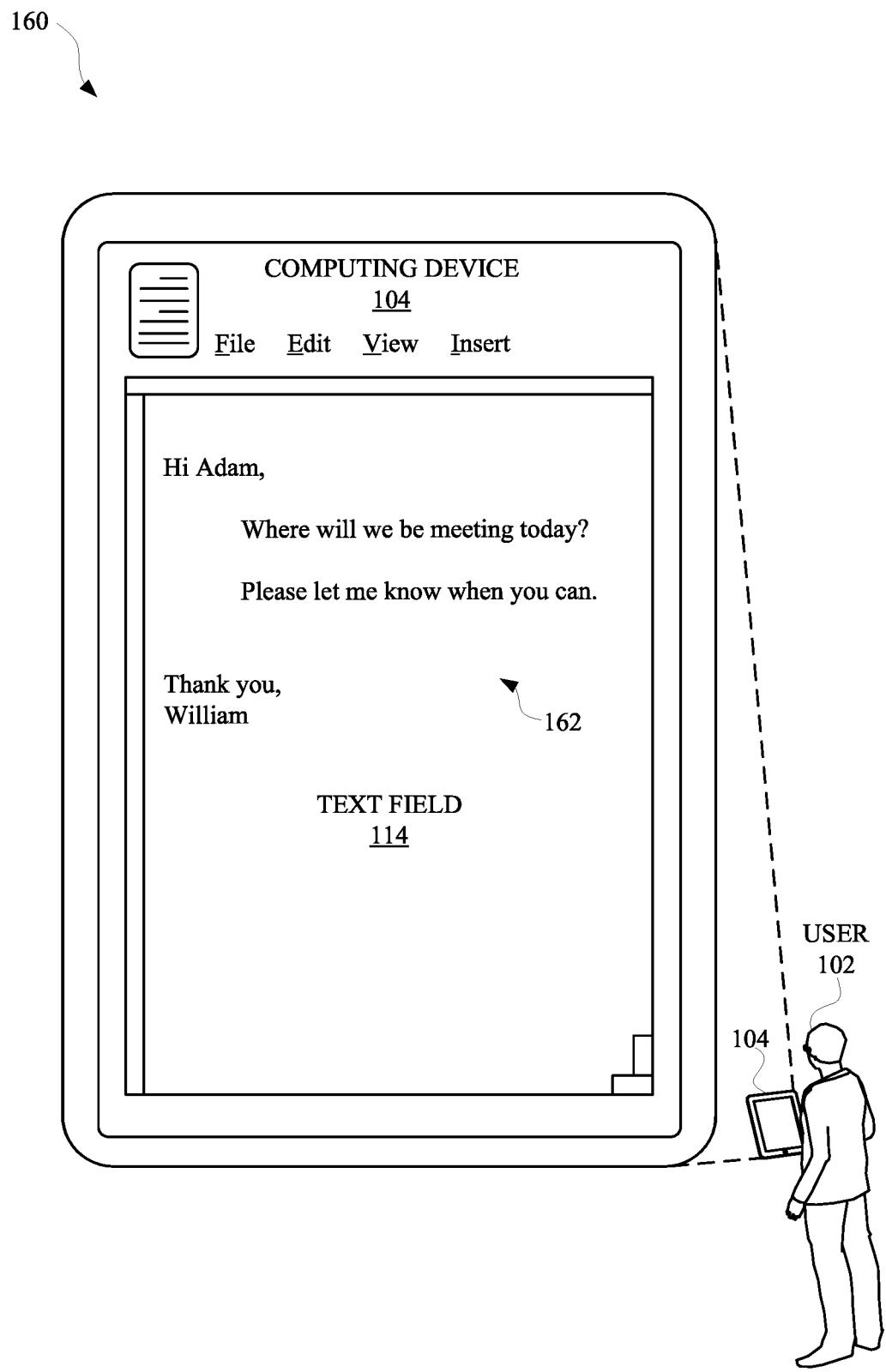

Using the textual content data 112, as indicated in view 120 of FIG. 1B, the application can identify textual content 122 to be incorporated into the text field 114 of the additional application (e.g., an email application). The textual content 122 can correspond to the natural language content that comprised the spoken utterance 106 provided by the user. Using the arrangement data 110, as indicated in view 140 of FIG. 1C, the application can identify arrangement commands 142 (e.g., carriage returns, ANSI code, ASCII code, ISO code, HTML, JavaScript, etc.) for the application, additional application, and/or computing device 104 to execute and/or implement with respect to the textual content 122 incorporated into the text field 114. Executing such arrangement commands 142 can cause arranged textual content 162 to be rendered in the text field 114, as illustrated in view 160 FIG. 1D.

In some implementations, the audio data 108 and/or any other data can be used as a basis for executing certain operations and/or intents in order to render the arranged textual content 162 in the text field 114. For example, and as illustrated in FIG. 1A, a duration of time between the portions of the audio data 108 that correspond to the textual content 122 can be used as a basis for the arrangement commands 142. The duration of time between the portions of the audio data 108 can be determined using, for example, an endpointing machine learning model that is trained to detect a start of the spoken utterance 106, pauses in the spoken utterance 106, and/or an end of the spoken utterance 106. For instance, a string of commands (e.g., two carriage returns) can be incorporated into the arranged textual content 162 between two portions of textual content. In some implementations, the string of commands can be identified based on a duration of a speech break 116 between a first portion 118A of spoken input (e.g., the spoken utterance 106) and a second portion 118B of the spoken input. In additional or alternative implementations, the string of commands can be identified based on the determined one or more intents associated with the spoken utterance 106. When the string of commands include one or more "new line" commands, "new bullet point" commands, and/or "new list item" commands, a vertical position of text corresponding to the first portion 118A of the spoken input can be different from a different vertical position of the second portion 118B of the spoken input.

Alternatively, or additionally, one or more commands for arranging textual content can be identified based on: the additional application that includes the text field 114, a type of application that is providing the text field 114, a type of document being drafted, a state of the additional application and/or the computing device 104, and/or any other information available to the application. For example, when the additional application is determined to be an email application and/or word processing application, the arrangement data 110 can be generated such that a comma and one or more carriage returns can be incorporated between the phrase "Thank you" and the name "William." Alternatively, or additionally, when the additional application is determined to be a text messaging application, the arrangement data 110 can be generated such that a comma and a space separate the phrase "Thank you" and the name "William." The comma can be incorporated in either instance without the user 102 having expressly recited the use of punctuation. For example, even though the user 102 may expressly recite "Thank you William" in their spoken utterance 106 without expressly saying the word "comma" or other formatting commands, the application can generate the arrangement data 110 and/or the textual content data 112 to incorporate a comma and carriage return between the phrase "Thank you" and "William."

In some implementations, the generation of the arrangement data 110 can be generated based on a heuristic process and/or one or more trained machine learning models. For example, one or more portions of the textual content can be processed using one or more trained machine learning models in order to generate a lower-dimensional representation of the textual content such as an embedding or word2vec representation for one or more terms or phrases included in the textual content. These lower-dimensional representations can be mapped to an embedding space or another latent space. When the mapped embedding is determined to be a threshold distance, in the embedding space or the latent space, from one or more other previously mapped embeddings corresponding to other terms and/or phrases, arrangement operations and/or formatting instructions for one or more other previously mapped embeddings corresponding to other terms and/or phrases can be identified as the arrangement data 110 and/or formatting instructions for those one or more portions of the textual content. Notably, these lower-dimensional representations can be specific to an intent associated with the spoken utterance and/or a type of application into which the textual content is incorporated. For instance, if the textual content is to be incorporated into an email, first arrangement data for a greeting can be determined as the arrangement data 110 for the greeting, whereas if the textual content is to be incorporated into a text message, second arrangement data for the same greeting can be determined as the arrangement data 110 for the greeting.

In some versions of these implementations, training data used to train the one or more trained machine learning models can be generated, and with permission from the user 102, how the user 102 arranged certain textual content for each respective application and for the textual content. For instance, each instance of training data can include training instance input and training instance output. The training instance input, for each of these training instances, can include, for example, one or more textual segments and/or an indication of an application in which the one or more textual segments are incorporated into, and the training instance output can include corresponding arrangement operations and/or formatting instructions for those one or more portions of the textual content included in the training instance input. The training instance input can be applied as input across one or more of the machine learning models to generate predicted output indicative of predicted arrangement operations and/or formatting instructions for those one or more portions of the textual content included in the training instance input. The predicted arrangement operations and/or formatting instructions for those one or more portions of the textual content can be compared to the training instance output to generate one or more losses, and one or more of the machine learning models can be updated based on one or more of the losses. Accordingly, at inference, the one or more trained machine learning models can be used to weigh certain arrangement operations and/or formatting operations for portions of text over other arrangement operations when generating the arrangement data 110. In this way, when the arrangement data 110 is executed in response to the spoken utterance 106, historical interactions involving the user 102 can be a basis for the application to arrange the textual content in the text field 114. Training of the machine learning model(s) can include, for example, on-device training and personalization of machine learning model(s) (without instances of training data leaving the respective device) and/or can include training via a federated learning framework, where gradients are generated locally on client devices based on instances of training data and only the gradients sent to remote server(s) (without instances of training data leaving the respective devices) for training of the machine learning model(s). The instances of training data can include those with training instance inputs with textual segments that are based on typed textual segments (e.g., via a virtual or hardware keyboard) and/or those with training instance inputs with textual segments that are based on transcriptions of spoken utterances. The instances of training data can include, for example, those with training instance outputs that are based on manual corrections, via voice or other means (e.g., via a virtual or hardware keyboard), to formatting. Training instance outputs that are based on manual corrections can indicate that the corresponding user found the corresponding final formatting acceptable.

Figure 2:
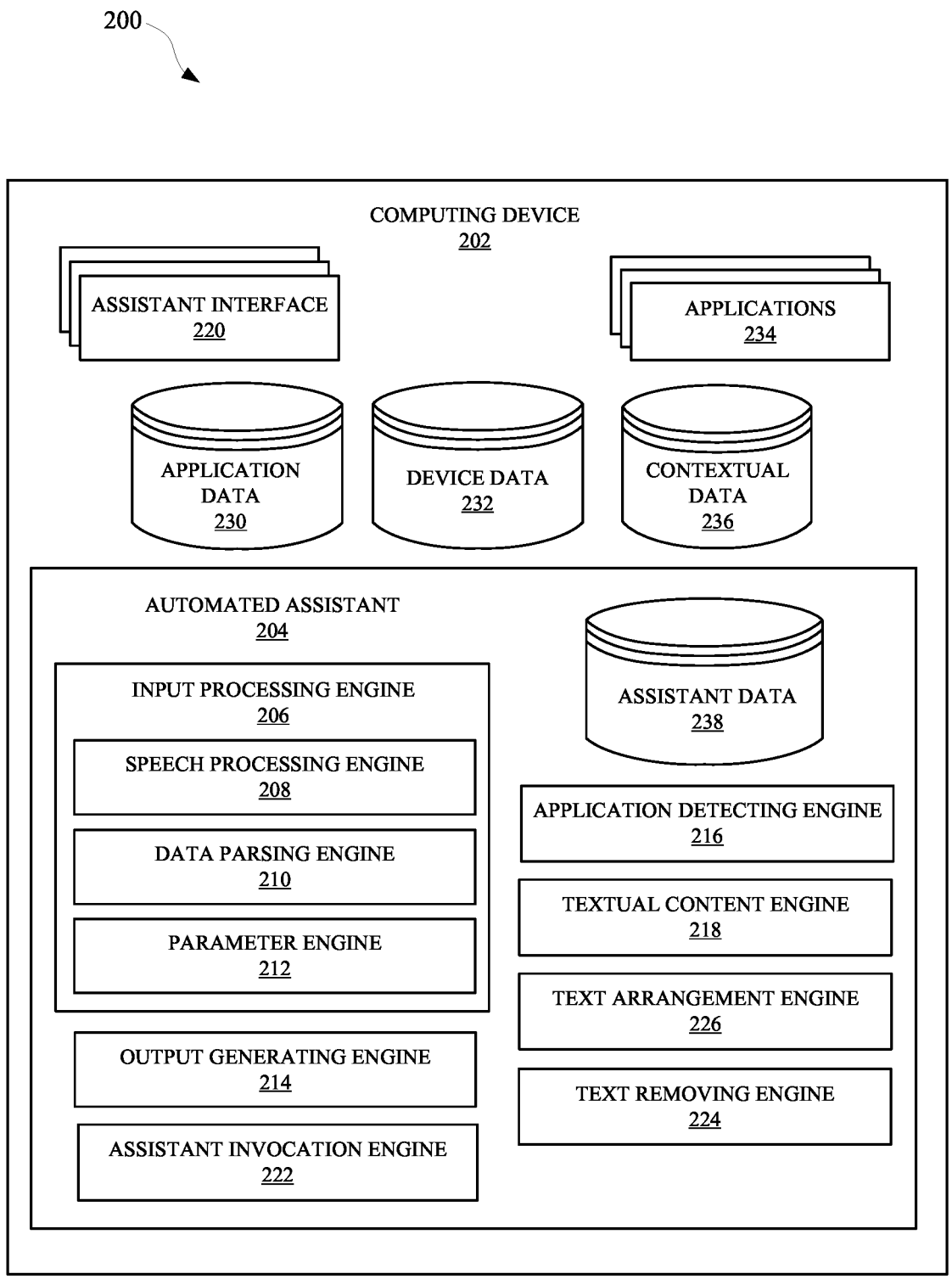
FIG. 2 illustrates a system that provides an automated assistant and/or application that can arrange textual content in furtherance of completing a speech-to-text operation without a user having to expressly identify arrangement operations.

FIG. 2 illustrates a system 200 that provides an automated assistant 204 and/or application can arrange textual content in furtherance of completing a speech-to-text operation without a user having to expressly identify arrangement operations. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.).

Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other client devices can be in communication with a server device over a wide area network (WAN), such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed locally at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the textual content embodied in the audio data. The audio data can be transmitted from, for example, the computing device 202 to the server device in order to preserve computational resources at the computing device 202, and the textual content can be received from the server device. Additionally, or alternatively, the audio data can be exclusively processed at the computing device 202 to identify the textual content.

The process for converting the audio data to the textual content can include processing the audio data using a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data generated by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 to provide output for presentation to a user, and/or communicate with one or more applications 234 to provide output for presentation to a user via one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device NLU, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized textual content for a spoken utterance (if any) present in the audio data. Also, for example, on-device NLU can be performed using an on-device NLU module (or the data parsing engine 210) that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized textual content can at least selectively be transmitted to remote automated assistant component(s) for remote NLU and/or remote fulfillment. For instance, the recognized textual content can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider this data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states.

The instances of training data can be generated in order to capture training data that characterizes contexts in which the user invokes the automated assistant and other contexts in which the user does not invoke the automated assistant. For example, a user may invoke their automated assistant to perform speech-to-text operations when the user is accessing a particular word processing application, a text messaging application, an email application, a social media application, a task application, a calendar application, a reminders application, etc. The one or more trained machine learning models can therefore assist with indicating that a user is intending to invoke their automated assistant when the user opens one or more of these applications. In this way, the user can provide spoken utterances to the automated assistant for performing speech-to-text operations, without necessarily providing an express invocation command to the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment of the computing device 202. Additionally, or alternatively, the assistant invocation engine 222 can cause the automated assistant 204 to detect, or limit detecting for one or more assistant commands from a user based on features of a context and/or an environment of the computing device 202.

In some implementations, the system 200 can include an application detecting engine 216, which can optionally be used to detect a type of application at which the user may be detecting a speech-to-text operation at the computing device 202. The automated assistant 204 can detect the type of application using data available to the system 200 in order to determine an arrangement of text should be implemented for the speech-to-text operation. For example, when the type of application is determined to be an email application, a text arrangement engine 226 of the system 200 can generate carriage return data and tab data for arranging text in a letter format. Alternatively, or additionally, when the type of application is determined to be a task application, the text arrangement engine 226 of the system 200 can generate bullet point data for arranging text in a bulleted-list format.

In some implementations, the system 200 can include a textual content engine 218 and a text arrangement engine 226 for determining how textual content should be arranged in one or more fields of one or more applications in response to a spoken utterance from a user. In some implementations, vocalization features of a spoken utterance can be identified to determine how textual content should be arranged within a field of an application. In additional or alternative implementations, an intent associated with a spoken utterance can be utilized to determine how textual content should be arranged within a field of an application. The intent associated with the spoken utterance can be determined based on processing the spoken utterance (e.g., determined using the data parsing engine 210 as described above) and/or based on a type of application being utilized when the automated assistant is invoked. Alternatively, or additionally, vocalization features of a spoken utterance can be identified for use by a text removing engine 224 for determining an amount of textual content to remove from a field of an application.

In some implementations, the textual content engine 218 and the text arrangement engine 226 can identify textual content and arrangement commands to employ in a field of an application based on the vocalization features. For instance, an intonation characteristic of a particular word or phrase spoken by a user can indicate how the particular word or phrase should be arranged within the field. In some implementations, an amount of time between spoken letters (e.g., determined using the endpointing machine learning model described with respect to FIG. 1) can indicate that the user is intending to pronounce an acronym. Therefore, even though the user has not expressly identified punctuation or other arrangements for the acronym, the automated assistant 204 can employ the text arrangement engine 226 to identify certain punctuation and/or arrangement data based on the intonation characteristic. Thereafter, should the user provide a command for deleting some amount of textual content, a text removing engine 224 can identify an amount of text to remove based at least on these vocalization features of one or more previously provided spoken utterances. For example, a user that provides the command "clear" after pronouncing an acronym can cause the automated assistant 204 to remove a single character, punctuation mark, and/or space from the field. However, if the user has provided the command "clear" after uttering a word (e.g., "Thank . . . "), the automated assistant 204 can select the word to be removed, instead of a single character.

In some implementations, the user can provide a series of the same or similar commands to the automated assistant 204 for removing textual content from a field of an application. In response, the automated assistant 204 can remove a different length of a segment of textual content for each respective command. For example, when the user is drafting a letter by providing spoken utterances to the automated assistant 204, the user can provide a "delete" command via spoken utterance for removing textual content from the letter. In response, the text removing engine 224 can identify a length for a first segment of text to be removed from the field and cause the segment of text to be removed. If the user provides another instance of the delete command, the text removing engine 224 can identify another length for a second segment of text to be removed from the field, and the second segment can be longer than the first segment. Moreover, if the user provides yet another instance of the delete command via spoken utterance, the text removing engine 224 can identify yet another length for a third segment of text to be removed from the field, and the third segment can be longer than the first segment and the second segment. In some implementations, the third segment can be longer than the combination of the lengths of the first segment and the second segment.

Figure 3:
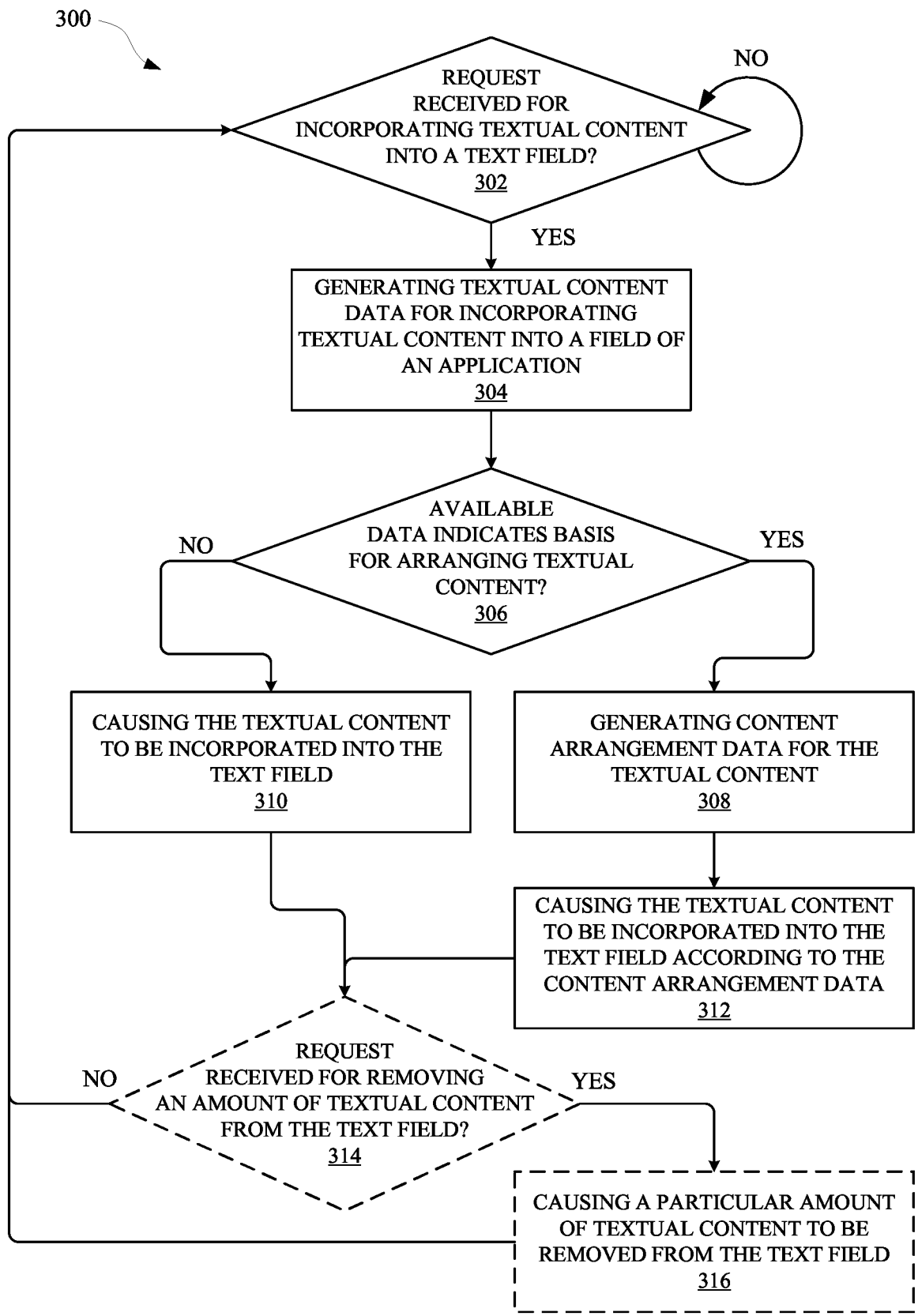
FIG. 3 illustrates a method for operating an application and/or automated assistant to incorporate textual content into a text field according to an arrangement that may not be expressly identified in an input from a user.

FIG. 3 illustrates a method 300 for operating an application and/or automated assistant to incorporate textual content into a text field according to an arrangement that may not be expressly identified in an input from a user. The method 300 can be performed by one or more applications, devices, and/or any other apparatus or module capable of performing speech-to-text operations. The method 300 can include an operation 302 of determining whether a request has been received for incorporating textual content into a text field. The request can be embodied in a spoken utterance that is provided by a user to the application and/or automated assistant that is accessible via a computing device. In some implementations, the request can be provided when the user is accessing an additional application that is rendering a text field at a display interface of the computing device. In other implementations, the request can be provided without the user accessing any additional application. Put another way, the request can initiate providing of textual content to be included in a text field (e.g., initiate an email, a text message, a to-do list, etc.). When the user is determined to have provided a request for incorporating textual content into the text field, the method 300 can proceed from the operation 302 to an operation 304.

For example, the additional application can be a note taking application that the user often employs for creating grocery lists, to-do lists, and other reminders. When the additional application is open at the computing device, the user can invoke the application for performing a speech-to-text by providing an invocation phrase such as, "Assistant." Following this invocation phrase, the user can provide items to be listed in the text field such as, "Three gallons of water, a roll of aluminum foil, and salt in a box." As another example, the user can simply provide a spoken utterance of "start a new to-do list" that, when detected, causes the automated assistant to create a new list. Further, as the user adds new entries to the to-do list, each entry can begin on a separate line or a separate bullet point (and optionally without the user having to explicitly provide a spoken command to do so, such as "next").

The operation 304 can include generating textual content data for incorporating textual content into a field of an application. The textual content can be generated based on processing audio data corresponding to the spoken utterance from the user (e.g., using the speech processing engine 208 of FIG. 2). The textual content data can characterize the natural language content to be incorporated into the field of the application. In some implementations, processing of the audio data can be performed using one or more trained machine learning models in order to identify words and/or phrases that should be grouped together within and/or omitted from the field of the application. When the textual content has been identified by the textual content data, the method 300 can proceed from the operation 304 to an operation 306.

The operation 306 can include determining whether data available to the application provides a basis for arranging the textual content within the field of the additional application. When the data is available that provides a basis for arranging the textual content, the method 300 can proceed from operation 306 to an operation 308. Otherwise, the method 300 can proceed from the operation 306 to an operation 310. The operation 310 can include causing the textual content to be incorporated into the text field of the additional application, and the operation can proceed to operation 314. Operation 314 is described below. The operation 308 can include generating content arrangement data for the textual content. The content arrangement data can characterize one or more operations and/or commands to execute in order for the textual content to be arranged within the text field according to a predicted intention of the user.

For example, in some implementations, the data available to the application can indicate that the application is a note taking application that the user has previously employed to create lists. Based on this determination, the application and/or automated assistant can process the audio data and/or textual content data in order to identify locations within the textual content to insert arrangement data. For example, the audio data and/or textual content data can be processed in order to identify a first portion of the textual content that should be separated from a second portion of the textual content by one or more arrangement operations (e.g., one or more carriage returns). In some implementations, the audio data and/or textual content can be processed using one or more heuristic processes and/or one or more trained machine learning models in order to identify the one or more arrangement operations and/or where to implement the arrangement operations within the textual content.

For example, the one or more trained machine learning models can be trained using training data characterizing one or more other documents generated using the note taking application and/or one or more other applications capable of being employed for note taking. In this way, the application and/or automated assistant can be trained to identify arrangements of textual content in different documents based on their corresponding textual content, a type of application, a type of user (with prior permission from users), a time for creation of the document, a location that the document was created, and/or any other information that can provide a basis for arranging textual content a certain way. For instance, a user may typically access their "to do" list at their home in the mornings, therefore speech-to-text operations performed in the morning at the home of the user may incorporate arrangement data for creating a "list," as opposed to creating a formal letter arrangement and/or journal entry arrangement.

Alternatively, or additionally, a user may typically generate a journal entry at night when they are on their way home from work using their automated assistant. Therefore, when the user is determined to be on their way home from work and requesting performance of a speech-to-text operation be performed by the automated assistant, the automated assistant can identify one or more arrangement operations. The one or more arrangement operations can be identified for incorporating into the textual content of the journal entry (e.g., indent(s), new line(s), date, signature, heading, font, color, size, etc.) based on prior instances in which the user and/or one or more other users generated journal entries. For example, one or more portions of the textual content and/or contextual data can be processed using one or more trained machine learning models in order to generate an embedding that can be mapped to a latent space. When the mapped embedding is determined to be a threshold distance from one or more other embedding corresponding to arrangement operations and/or formatting instructions, the arrangement operations and/or formatting instructions can be executed with respect to those one or more portions of the textual content.

The method 300 can proceed from the operation 308 to an operation 312, which can include causing the textual content to be incorporated into the text field according to the content arrangement data. In some implementations, when the textual content is incorporated into the text field, the method 300 can proceed to an optional operation 314 of determining whether the user has provided a request for removing an amount of textual content from the text field. The optional operation 314 may be considered optional in that performance of the operation 314 may be based on receiving one or more particular spoken utterances from the user. When the user is determined to not have provided such as a request, the method 300 can return to the operation 302. Otherwise, the method 300 can proceed to an optional operation 316 for causing a particular amount of textual content to be removed from the text field. Similar to the optional operation 314, the optional operation 316 may be considered optional in that performance of the operation 316 may be based on receiving one or more particular spoken utterances from the user at the optional operation 314.

In some implementations, causing the particular amount of textual content to be removed can be based on one or more prior inputs from the user to the application and/or automated assistant. Alternatively, or additionally, the amount of textual content to be removed can be based on content of the text field, the additional application providing the text field, a type of application corresponding to the additional application, an arrangement of the content within the text field, and/or any other information that can be associated with the textual content. For example, the request for removing the amount of textual content can be embodied in an additional spoken utterance such as, "Clear."

In response to receiving the additional spoken utterance, the automated assistant can determine that one or more most recent interactions between the user and the automated assistant included the user causing the automated assistant to incorporate a bulleted list of items into the text field. Based on this determination, the automated assistant can remove a single list item or other quantity of list items from the bulleted list of items in response to the additional spoken utterance. Alternatively, or additionally, the automated assistant can determine that one or more most recent interactions between the user and the automated assistant included the user causing the automated assistant to incorporate an acronym into the text field. Based on this determination, the automated assistant can remove a single character, or other quantity of characters, of the acronym in response to the additional spoken utterance from the user.

Figure 4:
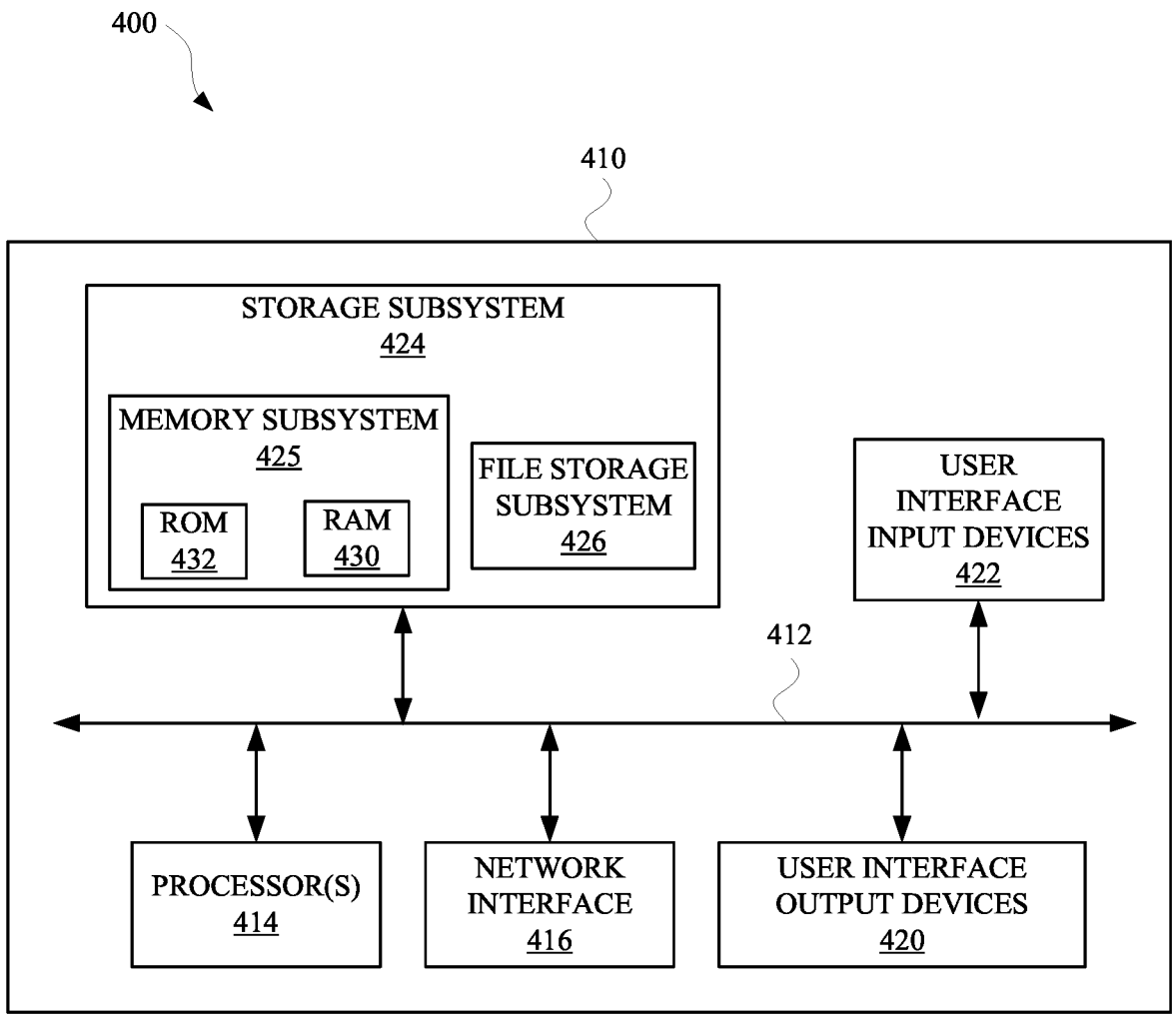
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided and includes receiving, at a computing device, a spoken utterance that is directed to a first application from a user. The spoken utterance corresponds to a request for the first application to perform a speech-to-text operation for incorporating text into a field of a second application that is different from the first application. The method further includes generating, based on the spoken utterance, textual content data that characterizes textual content to be incorporated into the field of the second application. The method further includes generating, based on an intent associated with the spoken utterance, content arrangement data that characterizes an arrangement, within the field of the second application, of a first portion of the textual content relative to a second portion of the textual content. The method further includes causing, in response to the spoken utterance and based on the textual content data and the content arrangement data, the textual content to be incorporated into the field of the second application according to the arrangement.

These and other implementations of the technology disclosed herein can include one or more of the following features.

In some implementations, generating the content arrangement data includes determining a duration of time between a first spoken portion of the spoken utterance and a second spoken portion of the spoken utterance, and determining the arrangement of the first portion of the textual content relative to the second portion of the textual content based on the duration of time. In some versions of those implementations, the arrangement includes a vertical position of the first portion of the textual content in the field of the second application relative to the second portion of the textual content. In some of those versions, causing the textual content to be incorporated into the field of the second application according to the arrangement includes causing, at the field of the second application, incorporation of the vertical position of the first portion of the textual content relative to the second portion of the textual content. As an example, causing incorporation of the vertical position of the first portion can include incorporating carriage return data into the field of the second application following the first portion of the textual content, and incorporating the second portion of the textual content following the carriage return data.

In some implementations, generating the textual content data includes identifying one or more punctuation symbols to include in the textual content to be incorporated into the field of the second application. In some of those implementations, the spoken utterance does not expressly identify a punctuation symbol to be incorporated into the field of the second application.

In some implementations, the textual content data characterizes the natural language content embodied in the spoken utterance and the content arrangement data characterizes a formatting command that, when executed by the second application, causes the second application to arrange the first portion of the textual content separate from the second portion of the textual content within the field of the second application.

In some implementations, the method further includes receiving, at the computing device, an additional spoken utterance that is directed to the first application from the user. The additional spoken utterance corresponds to an additional request for the first application to perform an additional speech-to-text operation for incorporating additional textual content into the field of the second application. In some versions of those implementations, the method further includes: causing, in response to the additional spoken utterance, the second application to incorporate the additional textual content into the field of the second application; and causing, in response to the additional spoken utterance, the second application to perform one or more formatting operations that modify another arrangement of the additional textual content relative to the textual content within the field. The one or more formatting operations are not expressly identified by the user via the additional spoken utterance. In some of those versions, the first application is an automated assistant and the second application is a word processing application and, optionally, the method further includes identifying the one or more formatting operations based on the additional spoken utterance and the textual content incorporated into the field of the second application.

In some implementations, a method implemented by one or more processors is provided and includes receiving, at a computing device, a first spoken utterance that corresponds to a request for a first application to perform a speech-to-text operation for a user. The method further includes causing, based on the first spoken utterance, textual content to be rendered within a field of a second application. The textual content includes natural language content of the first spoken utterance. The method further includes receiving, from the user, a second spoken utterance that corresponds to an additional request for the first application to remove a portion of the textual content from the field of the second application, but that does not expressly identify the portion of the textual content to be removed. The method further includes determining, in response to the second spoken utterance, an amount of content to remove from the textual content that is rendered within the field of the second application. The method further includes causing, in response to the second spoken utterance, the amount of content to be removed from the textual content that is rendered within the field of the second application.

These and other implementations of the technology disclosed herein can include one or more of the following features.

In some implementations, the amount of content to be removed is based on vocalization feature(s) exhibited by the user when providing at least a portion of the first spoken utterance. In some versions of those implementations, the vocalization feature(s) includes a duration of time between separate portions of the first spoken utterance, and the separate portions of the first spoken utterance describe different respective portions of the textual content. In some additional or alternative versions of those implementations, the vocalization feature(s) include an intonation characteristic embodied in the first spoken utterance, and the separate portions of the first spoken utterance describe different respective portions of the textual content.

In some implementations, determining the amount of content to remove from the textual content includes: determining that the vocalization feature of the first spoken utterance includes an express pronunciation of individual natural language characters and determining a quantity of the individual natural language characters to remove from the textual content that is rendered within the field of the second application. The textual content that is rendered within the field of the second application includes the individual natural language characters and the amount of content to be removed from the textual content corresponds to the quantity of the individual natural language characters.

In some implementations, determining the amount of content to remove from the textual content includes identifying a length of a first segment of text of the textual content. In those implementations, the first segment of text is a first portion of the textual content that was most recently incorporated into the field of the application. In some versions of those implementations, the method further includes receiving, at the computing device, an additional instance of the second spoken utterance for removing an additional portion of the textual content from the field of the application, and determining an additional amount of content to remove from the textual content. The additional amount of content includes a second segment of the textual content having a length that is longer than the first segment of the textual content. In some of those versions, the method further includes receiving, at the computing device, a further instance of the second spoken utterance for removing a further portion of the textual content from the field of the application, and determining a further amount of content to remove from the textual content. The further amount of content includes a third segment of the textual content having a separate length that is longer than the first segment of the textual content and that is longer than the second segment of the textual content. As one example, the first segment of the textual content can consist of a word, the second segment of the textual content can consist of a sentence, and the third segment of the textual content can consist of a paragraph comprising multiple sentences.

In some implementations, a method implemented by one or more processors is provided and includes receiving, at a computing device, a spoken utterance that is directed to a first application from a user. The spoken utterance corresponds to a request for the first application to perform a speech-to-text operation for incorporating text into a field of a second application that is different from the first application. The method further includes generating, based on the spoken utterance, textual content data that characterizes textual content to be incorporated into the field of the second application. The method further includes generating, based on a type of application of the second application, content arrangement data that characterizes an arrangement, within the field of the second application, of a first portion of the textual content relative to a second portion of the textual content. The method further includes causing, in response to the spoken utterance and based on the textual content data and the content arrangement data, the textual content to be incorporated into a field of the second application according to the arrangement.

These and other implementations of the technology disclosed herein can include one or more of the following features.

In some implementations, the content arrangement data is generated further based on one or more prior interactions that involved the user providing other textual content to the type of application corresponding to the second application.

Other implementations can include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations can include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
   receiving, at a computing device, a spoken utterance that is directed to a first application from a user,
      wherein the spoken utterance corresponds to a request for the first application to perform a speech-to-text operation for incorporating text into a field of a second application;
   generating, based on the spoken utterance, textual content data that characterizes textual content to be incorporated into the field of the second application, wherein the second application is different from the first application;
   generating, based on an intent associated with the spoken utterance, content arrangement data that characterizes an arrangement, within the field of the second application, of a first portion of the textual content relative to a second portion of the textual content;
   causing, based on the textual content data and the content arrangement data, the textual content to be incorporated into the field of the second application according to the arrangement, in response to the spoken utterance;
   receiving, at the computing device, an additional spoken utterance that is directed to the first application from the user,
      wherein the additional spoken utterance corresponds to an additional request for the first application to perform an additional speech-to-text operation for incorporating additional textual content into the field of the second application; and causing, in response to the additional spoken utterance, the second application to incorporate the additional textual content into the field of the second application; and causing, in response to the additional spoken utterance, the second application to perform one or more formatting operations that modify arrangement of the additional textual content relative to the textual content within the field,
   wherein the one or more formatting operations are not expressly identified by the user via the additional spoken utterance.

2. The method of claim 1, wherein generating the content arrangement data includes:
   determining a duration of time between a first spoken portion of the spoken utterance and a second spoken portion of the spoken utterance,
      wherein the arrangement of the first portion of the textual content relative to the second portion of the textual content is based on the duration of time.

3. The method of claim 2, wherein the arrangement includes a vertical position of the first portion of the textual content in the field of the second application relative to the second portion of the textual content.

4. The method of claim 3, wherein causing the textual content to be incorporated into the field of the second application according to the arrangement includes:
   causing, at the field of the second application, incorporation of the vertical position of the first portion of the textual content relative to the second portion of the textual content.

5. The method of claim 4, wherein causing incorporation of the vertical position of the first portion includes:
   incorporating carriage return data into the field of the second application following the first portion of the textual content, and
   incorporating the second portion of the textual content following the carriage return data.

6. The method of claim 1, wherein generating the textual content data includes:
   identifying one or more punctuation symbols to include in the textual content to be incorporated into the field of the second application,
      wherein the spoken utterance does not expressly identify a punctuation symbol to be incorporated into the field of the second application.

7. The method of claim 1,
   wherein the textual content data characterizes the natural language content embodied in the spoken utterance, and
   wherein the content arrangement data characterizes a formatting command that, when executed by the second application, causes the second application to arrange the first portion of the textual content separate from the second portion of the textual content within the field of the second application.

8. The method of claim 1, wherein the first application is an automated assistant and the second application is a word processing application, and the method further comprises:
   identifying the one or more formatting operations based on the additional spoken utterance and the textual content incorporated into the field of the second application.

9. A method implemented by one or more processors, the method comprising:
   receiving, at a computing device, a first spoken utterance that corresponds to a request for a first application to perform a speech-to-text operation for a user;
   causing, based on the first spoken utterance, textual content to be rendered within a field of a second application,
      wherein the textual content includes natural language content of the first spoken utterance;
   receiving, from the user, a second spoken utterance that corresponds to an additional request for the first application to remove a portion of the textual content from the field of the second application,
      wherein the additional request does not expressly identify the portion of the textual content to be removed;
   determining, in response to the second spoken utterance, an amount of content to remove from the textual content that is rendered within the field of the second application, wherein determining the amount of content to remove from the textual content comprises:
      identifying a length of a first segment of text of the textual content,
         wherein the first segment of text is a first portion of the textual content that was most recently incorporated into the field of the application;
   causing, in response to the second spoken utterance, the amount of content to be removed from the textual content that is rendered within the field of the second application;
   receiving, at the computing device, an additional instance of the second spoken utterance for removing an additional portion of the textual content from the field of the application,
   determining an additional amount of content to remove from the textual content,
      wherein the additional amount of content includes a second segment of the textual content having a length that is longer than the first segment of the textual content; and
   causing, in response to the additional instance of the second spoken utterance, the additional amount of content to be removed from the textual content that is rendered within the field of the second application.

10. The method of claim 9, wherein the amount of content to be removed is further based on a vocalization feature exhibited by the user when providing at least a portion of the first spoken utterance.

11. The method of claim 10,
   wherein the vocalization feature includes a duration of time between separate portions of the first spoken utterance, and
   wherein the separate portions of the first spoken utterance describe different respective portions of the textual content.

12. The method of claim 10,
   wherein the vocalization feature includes an intonation characteristic embodied in the first spoken utterance.

13. The method of claim 11, wherein determining the amount of content to remove from the textual content includes:
   determining that the vocalization feature of the first spoken utterance includes an express pronunciation of individual natural language characters,
      wherein the textual content that is rendered within the field of the second application includes the individual natural language characters; and determining a quantity of the individual natural language characters to remove from the textual content that is rendered within the field of the second application,
    wherein the amount of content to be removed from the textual content corresponds to the quantity of the individual natural language characters.

14. The method of claim 9, further comprising:
receiving, at the computing device, a further instance of the second spoken utterance for removing a further portion of the textual content from the field of the application, and
determining a further amount of content to remove from the textual content,
    wherein the further amount of content includes a third segment of the textual content having a separate length that is longer than the first segment of the textual content and that is longer than the second segment of the textual content.

15. The method of claim 14, wherein the first segment of the textual content includes a word, the second segment of the textual content includes a sentence, and the third segment of the textual content includes a paragraph comprising multiple sentences.

16. A method implemented by one or more processors, the method comprising:
receiving, at a computing device, a first spoken utterance that corresponds to a request for a first application to perform a speech-to-text operation for a user;
causing, based on the first spoken utterance, textual content to be rendered within a field of a second application,
    wherein the textual content includes natural language content of the first spoken utterance;
receiving, from the user, a second spoken utterance that corresponds to an additional request for the first application to remove a portion of the textual content from the field of the second application,
    wherein the additional request does not expressly identify the portion of the textual content to be removed;
determining, in response to the second spoken utterance, an amount of content to remove from the textual content that is rendered within the field of the second application,
    wherein the amount of content to be removed is based on a vocalization feature exhibited by the user when providing at least a portion of the first spoken utterance, and
    wherein the vocalization feature includes an intonation characteristic embodied in the first spoken utterance; and
causing, in response to the second spoken utterance, the amount of content to be removed from the textual content that is rendered within the field of the second application.

* * * * *